Dec. 15, 1970 P. H. WENDLAND 3,548,193

STRUCTURE TO CONVERT INFRARED RADIATION IMAGES TO VISIBLE RADIATION IMAGES USING A PHOTOCONDUCTIVE ELEMENT HAVING A PLURALITY OF ISOLATED JUNCTIONS THEREIN

Original Filed May 22, 1967

Paul H. Wendland,
INVENTOR.
BY
Neil J. Driscoll
ATTORNEY.

United States Patent Office 3,548,193

Patented Dec. 15, 1970

3,548,193

STRUCTURE TO CONVERT INFRARED RADIATION IMAGES TO VISIBLE RADIATION IMAGES USING A PHOTOCONDUCTIVE ELEMENT HAVING A PLURALITY OF ISOLATED JUNCTIONS THEREIN

Paul H. Wendland, Los Angeles, Calif., assignor to Hughes Aircraft Company, Culver City, Calif., a corporation of Delaware Continuation of application Ser. No. 640,232, May 22, 1967. This application Jan. 28, 1969, Ser. No. 797,364
Int. Cl. H01l 17/60
U.S. Cl. 250—83.3 8 Claims

ABSTRACT OF THE DISCLOSURE

A light-transparent substrate is provided with a coating of transparent electrically conductive material. Surface imposed on the transparent conductive material is a layer of electroluminescent material. A second layer of invisible radiation-sensitive material is positioned to overlie the electroluminescent material. The surface of the invisible radiation-sensitive material is provided with a plurality of downwardly extending pedestals, said pedestals surface engaging the electroluminescent material. A second layer of electrically conductive material is surface imposed on the invisible radiation-sensitive material on the side thereof removed from pedestals. The pedestals comprise a plurality of p-n junctions. Upon application of an alternating current voltage to the electrically conductive layers, the electroluminescent material is excited and emits visible light in direct response to the degree and intensity of invisible radiation incidentally impinging on the invisible radiation-sensitive material. Thus, invisible radiation is converted to visible radiation.

Figure 1:
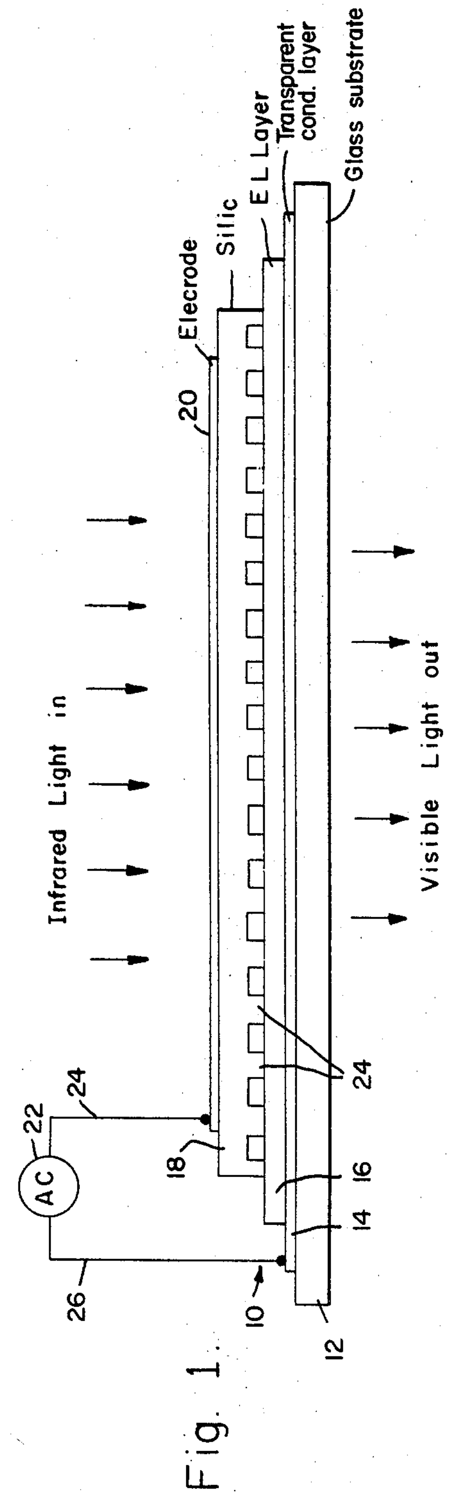

This application is a continuation of application 640,232, filed May 22, 1967, now abandoned.

The invention is directed to a panel-like device providing visible images as the result of the reception of invisible radiation on one surface of the device. In addition to converting infrared radiation to visible radiation the device is effective to amplify the radiation level to provde higher brightness images.

It is well known and has frequently been demonstrated that electroluminescent material may be used in physical conjunction with photoconductive material to provide a device to amplify light images. Typical devices to achieve light amplification have been described in the American Optical Society Journal, vol. 47, at pg. 887 and following. One such device or structure uses two thin layers of different materials for photo control and light emission. In one example, a glass plate is provided having a transparent electrically conductive coating on one side with layers of electroluminescent material and photoconductive material, respectively, sandwiched thereon. Another transparent electrically conductive coating is superimposed on and engages the surface of the photoconductive material. The conductive coatings form electrodes. An alternating voltage is then applied to the respective electrodes. Generally, the normal impedance per unit area of the photoconductive layer is substantially greater than the impedance of the electroluminescent layer per unit area. This condition, of course, assumes no incident radiation impinging on the photoconductive layer. Then the applied A.C. voltage is taken entirely across the photoconductive layer, the illuminescent layer is not electrically stimulated, and consequently no light is emitted from the electroluminescent layer. When incident visible radiation falls upon the photoconductive layer the impedance thereof substantially decreases and an increasing portion of the applied A.C. voltage is carried over the adjacent electroluminescent layer exciting the latter and causing light to emit. The reduction in impedance in the photoconductive layer is directly related to the intensity of the incident radiation received and, accordingly, the intensity of the light emitted from the electroluminescent layer is directly related to the intensity of the incident radiation engaging the photoconductive layer. In general, prior art devices of the type described have been typically used in image intensifying arrangements such as in low level output cathode ray tubes and the like.

While the prior art devices have been generally successful in amplifying, i.e., increasing the brightness of incident visible radiation, none have been successful in converting radiation in the invisible spectral band such as infrared to visible emitted light. It has been found that the materials available which are sensitive to infrared radiation have such a relatively low dark impedance that the applied A.C. voltage is not taken across that material in the dark condition and consequently an excited electroluminescent layer continuously emits light. The conversion, therefore, of invisible radiation to visible radiation has heretofore been impossible.

Accordingly, it is a primary object of the invention to provide a simple easily constructed device which is effective to convert incident invisible radiation to emitted visible radiation.

It is a further object of the invention to provide a device of the type described which additionally amplifies the level of the incident invisible radiation and provides a relatively high brightness visible image.

It is a specific object of the invention to provide a mosaic array of p-n junctions which are infrared sensitive in physical juxtaposition with an electroluminescent layer of material so that incident invisible infrared radiation is effectively converted to a visible image.

Figure 2:
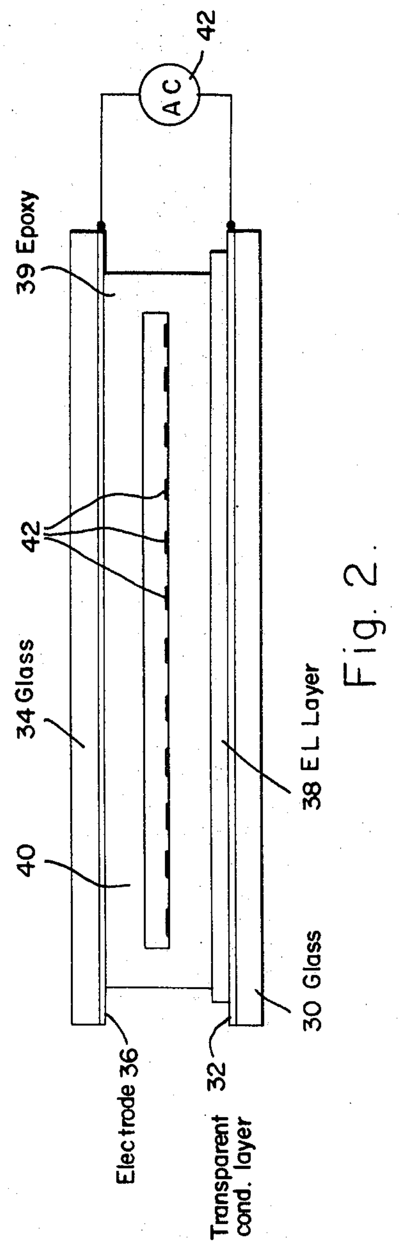

These and other objects of the invention will become apparent in the course of the following description and from an examination of the related drawing wherein:

FIG. 1 is a greatly enlarged side-elevational view of a typical panel providing the infrared-to-visible radiation conversion; and FIG. 2 is a greatly enlarged side-elevational view of a slightly modified embodiment of the invention.

Directing attention to FIG. 1, the numeral 10 generally indicates a typical converter panel. In its simplest form, the panel 10 comprises a transparent glass substrate 12 supporting the entire arrangement. A transparent layer of electrically conductive material 14 is surface-imposed on one side of the glass substrate 12 in any convenient manner. For example only, tin oxide is a suitable substance. Thereabove, a layer of electroluminescent material 16 such as phosphor may be positioned. In practice, the electroluminescent layer may have a generally uniform thickness in the range of 1–5 mils. The layer may be applied by spraying and any suitable binder may be used. A material that has been found satisfactory is well known in the field as Siemans phosphor. Superimposed on the electroluminescent layer 16 is yet another layer of infraredresponsive material indicated at 18. Typical materials which provide satisfactory results are silicon and germanium. Overlying the entire sandwiched arrangement an infrared transparent layer of electrically conductive material is positioned at 20. Layers 14 and 20 thus provide spaced electrodes. A source of alternating voltage 22 is provided and electrical leads 24 and 26 apply the voltage to the electrodes 14 and 20, respectively.

Assuming the infrared-sensitive material 18 to be silicon, attention is directed to the fact that a plurality of pedestals or mesas 24, 24 which have p-n junctions in their surface are provided at the lower surface of the infrared sensitive material 18 and it is these pedestals that directly engage the electroluminescent layer 16. One mode of producing such a pedestal or mesa structure in a single crystal silicon wafer utilizes conventional evaporated photoresist technique and thereafter acid etching the surface. Upon positioning of the infrared-sensitive layer 18 on the electroluminescent layer 16, the pedestals or mesas provided a plurality of p-n junctions between the infrared-sensitive layer and the electroluminescent layer. For example, one device was constructed using this technique and produced approximately 150,000 individual junctions in a one square inch area.

FIG. 2 is a slightly modified embodiment of the arrangement. Numeral 30 designates a glass substrate. An electrically conductive layer or electrode is shown at 32. At the upper aspect of the arrangement another glass plate is shown at 34 provided with an electrically conductive layer or second electrode 36. An electroluminescent layer 38 is carried by electrode 32.

A silicon wafer 40 is positioned intermediate the electrodes 32 and 36 and is embedded at that location in an epoxy 39 which physically separates the wafer from the respective electrodes. Surface barrier junctions are provided at the lower aspect of the wafer 40 and indicated by the heavy lines 42, 42. In an operating device that type of barrier known in the art as a Schottky barrier has been found satisfactory. Again a source of alternating current 42 interconnects the electrodes 32 and 36.

In operation, an alternating current voltage may be applied to electrodes 14 and 20 via the source 22 in a range of 70–100 volts. With no infrared radiation incident and impinging on layer 18 the electroluminescent layer remains dark. As infrared radiaion incidentally falls on layer 18 the electroluminescent layer 16 begins to emit visible radiation and as the intensity of the incident infrared radiation increases, the visible emitted light increase proportionately. In the constructed device, for example, the electroluminescent layer was dark with 70 volts applied across the electrodes until approximately $10^{-6}$ watts per centimeter of infrared radiation impinged on the silicon mosaic. At this point excitation of the luminescent layer was noted and visible light began to be emitted. As the infrared intensity increased, the proportional brightness or emitted visible light likewise increased.

The embodiment of FIG. 2 operates essentially in the manner above described. With the alternating current applied the electroluminescent layer remains dark until incident radiation falls upon the wafer 40. A capacitive coupling is set up between the electrode 36 and wafer 40 and between the wafer 40 and electrode 32 through the luminescent layer 38. As radiation strikes the wafer 40 the impedance therein falls and the load is transferred to the luminescent layer 38 at the surface barrier junctions 42 and visible light is emitted at glass substrate 30 in the area of each junction.

It will thus be apparent that the structure disclosed provides a simple, efficient, highly effective panel structure to convert invisible radiation to a visible image.

The invention as disclosed is by way of illustration and not limitation and may be subject to many variations within the spirit and scope thereof.

What is claimed is:

1. A device to convert invisible radiation images to visible radiation images, which comprises:
- first and second spaced electrodes, said electrodes being radiation transparent;
- a layer of electroluminescent material intermediate said first and second spaced electrodes and physically engaging said first spaced electrode;
- a layer of invisible radiation-sensitive material having a first surface and a second surface, the first surface being adjacent to said second spaced electrode;
- a plurality of laterally isolated junctions formed in the second surface of said layer of invisible radiation-sensitive material, the second surface of said layer of invisible radiation-sensitive material being adjacent to said layer of electroluminescent material; and
- means for applying a voltage to said first and second spaced electrodes to operably provide a visible radiation image from said layer of electroluminescent material in response to a change in electrical resistance of said plurality of laterally isolated junctions inversely proportional to invisible radiation images impinging on the first surface of said layer of invisible radiation-sensitive material.

2. A device as claimed in claim 1 wherein:
- said invisible radiation image are infrared radiation images.

3. A device as claimed in claim 1 wherein said plurality of laterally isolated junctions are surface barrier junctions formed on the second surface of said layer of invisible radiation-sensitive material.

4. A device to convert invisible radiation images to visible radiation images according to claim 1,
- wherein said plurality of laterally isolated junctions are p-n junctions formed in pedestals in the second surface of said layer of invisible radiation-sensitive material.

5. A device to convert invisible radiation images to visible radiation images according to claim 1,
- wherein said invisible radiation-sensitive material is silicon.

6. A device to convert invisible radiation images to visible radiation images to visible radiation images according to claim 1,
- wherein said invisible radiation-sensitive material is germanium.

7. A device to convert invisible radiation images to visible radiation images according to claim 1, and including,
- a transparent substrate supporting the entire device.

8. A device to convert invisible radiation images to visible radiation images according to claim 1,
- wherein the voltage applied to said first and second spaced electrodes is alternating.

References Cited

UNITED STATES PATENTS

| | | | |
|---|---|---|---|
| 2,999,941 | 9/1961 | Klasens et al. | 250—213 |
| 3,015,034 | 12/1961 | Hanlet | 250—211 |
| 3,369,125 | 2/1968 | Dueker | 250—213 |
| 3,412,252 | 11/1968 | Grimmeiss | 250—83.31 |

ARCHIE R. BORCHELT, Primary Examiner

M. J. FROME, Assistant Examiner

U.S. Cl. X.R.

250—71, 211; 317—235

PO-1050
(5/69)

UNITED STATES PATENT OFFICE
CERTIFICATE OF CORRECTION

Patent No. 3,548,193 Dated December 15, 1970

Inventor(s) Paul H. Wendland

It is certified that error appears in the above-identified patent and that said Letters Patent are hereby corrected as shown below:

Col. 3, line 23 - "15,000" instead of "150,000".
Page 6, line 1

Col. 4, line 46 - Delete "to visible radiation images".

Signed and sealed this 26th day of September 1972.

(SEAL)
Attest:

EDWARD M.FLETCHER,JR.
Attesting Officer

ROBERT GOTTSCHALK
Commissioner of Patents